United States Patent [19]

Erb

[11] 4,443,987
[45] Apr. 24, 1984

[54] UNITARY SOLAR WINDOW PANEL

[75] Inventor: Robert A. Erb, Valley Forge, Pa.

[73] Assignee: The Franklin Institute, Philadelphia, Pa.

[21] Appl. No.: 299,161

[22] Filed: Sep. 3, 1981

Related U.S. Application Data

[63] Continuation of Ser. No. 24,518, Mar. 28, 1979.

[51] Int. Cl.$^3$ ............................................... E06B 7/12
[52] U.S. Cl. ................................. 52/309.1; 52/789; 126/445; 428/34
[58] Field of Search ................... 52/309.1, 788, 789, 52/790, 306, 307, 308, 202; 350/263, 259, 264; 126/445, 1; 428/178, 46; 47/17

[56] References Cited

U.S. PATENT DOCUMENTS

| | | |
|---|---|---|
| 2,689,387 | 9/1954 | Carr . |
| 2,714,816 | 8/1955 | Pennell ................................. 52/306 |
| 3,252,260 | 5/1966 | Mills . |
| 3,341,395 | 9/1967 | Weber . |
| 3,744,199 | 7/1973 | Navarre . |
| 4,006,573 | 2/1977 | Biebuyek ............................ 52/206 |
| 4,035,539 | 7/1977 | Luboshez ............................ 52/790 |
| 4,114,597 | 9/1978 | Erb ...................................... 126/448 |
| 4,283,451 | 8/1981 | Abrahami .......................... 350/259 |
| 4,301,787 | 11/1981 | Rice .................................... 52/202 |

FOREIGN PATENT DOCUMENTS

| | | |
|---|---|---|
| 661203 | 4/1962 | Canada . |
| 2722817 | 11/1978 | Fed. Rep. of Germany ..... 52/309.1 |
| 1401279 | 4/1965 | France ................................. 52/306 |
| 1471249 | 1/1967 | France ................................. 52/202 |
| 1485237 | 6/1967 | France ............................. 52/309.1 |
| 1529766 | 6/1968 | France . |
| 498520 | 7/1979 | Italy ................................ 52/309.1 |

Primary Examiner—Henry E. Raduazo
Attorney, Agent, or Firm—Weiser, Stapler & Kimmelman

[57] ABSTRACT

A unitary, coextruded panel adapted for use as the window of a structure, which panel combines light transmitting and light reflecting properties to permit passage of direct solar radiation at a low solar altitude and to prevent passage of direct solar radiation at a high solar altitude, and which also provides insulating dead air spaces.

The panel comprises an essentially clear and planar inner and outer face, positioned along the inner and outer portions of the structure, respectively, and a plurality of ribs, connected to and extending between the inner and outer faces, some of which ribs are transparent, and some of which are opaque to solar radiation, which rib members are placed in a geometrical relationship which provides the selected light transmitting and light reflecting properties in relation to the solar altitude.

33 Claims, 16 Drawing Figures

UNITARY SOLAR WINDOW PANEL

This is a continuation, of application Ser. No. 024,518, filed Mar. 28, 1979.

BACKGROUND OF THE INVENTION

This invention relates generally to the field of passive solar energy systems, and in particular, to a solar window panel having light transmitting and light reflecting properties which vary in relation to the seasons of the year.

An effective solar window for a passive solar heated structure should possess the following characteristics, especially for space heating of that structure:

1. During the winter months, solar radiation should be permitted to pass through the window, and into the structure;
2. During the summer months, solar radiation should be prevented from passing through the window, and into the structure;
3. At all times, but particularly during the winter months, the solar window should insulate against conductive-convective-reradiative heat loss from the structure; and
4. At all time, but particularly during the summer months, the solar window should insulate against conductive-convective-reradiative heat gains within the structure, when the outside ambient temperature is greater than that desired inside the structure.

Ordinary single glazed panels (glass or plastic) only provide the first characteristic, failing to provide the remaining characteristics.

Multiple glazed panels have been produced to improve this result. A double glazed panel will provide the first characteristic above mentioned, and will at least in part, assist in providing the third and fourth characteristics. However, the second characteristic is not provided.

A triple glazed panel improves upon the results obtained using a double glazed panel, however, the second characteristic is still not provided. Moreover, the cost of producing a triple glazed panel, using the present techniques of manufacture, becomes prohibitive, reducing its costs effectiveness as an energy system.

In an effort to further improve upon the performance of multiple glazed panels, there have also beeen produced double-walled, ribbed glazed panels. Two commercially available examples of these structures are manufactured by CY/RO Industries ("Acrylite" SDP [acrylic] and Polycarbonate SDP sheet), and by Rohm and Haas Co. ("Tuffak Twinwall" polycarbonate). While these structures provide the first, third and fourth characteristics, the second characteristic still is not provided.

Irrespective of which of the above glazed panels is used, a structure, particularly one having unshaded, south vertical or sloping windowed walls or roofs, invariably became overheated in the warmer months. Structural overhangs, reflective drapes, venetian blinds, and shades have been used in an attempt to reduce this overheating problem. However, such measures are only partially effective, involve relatively complex and expensive structures, and is some applications, cannot be readily used, e.g., greenhouses.

Recognizing the shortcomings of the above mentioned glazed panels, there have been developed panels having light transmitting and light reflecting properties which respond to the solar altitude. These panels generally comprise an inner and an outer glazed panel or face between which are positioned a plurality of longitudinally extending vanes. These vanes are provided with means for reflecting or filtering solar radiation, which means interact with the vanes and the glazed panels to provide, at least in part, the above identified four characteristics. Examples of such panels may be found, for example, in U.S. Pat. Nos. 4,091,592; 4,035,539; 3,940,896; 3,642,557; 3,077,643; 3,059,537; 2,874,611; and 2,849,762.

Although such vaned-glazed panels provide improved results in obtaining the four characteristics necessary to produce an effective solar window, such panels exhibit several disadvantages which seriously impair their ultimate utility as a passive solar energy system.

The primary disadvantage exhibited by such panels is that they invariably require the assembly of discrete components to produce the desired result. Generally such panels comprise a separate pair of glazed panels, having positioned therebetween a third assembly, which assembly comprises a plurality of discretely produced vanes. This results in an assembly of numerous components to produce a single solar window. The disadvantages of this are many.

Cost is an extremely important factor in producing a commercially acceptable passive solar energy system. The costs of production necessarily rise in proportion to both the number of discrete components needed to produce the panel, as well as the number of steps that are required to assemble that panel. Consequently, such multi-component panels are not cost competitive with any savings in heating and cooling costs which they may ultimately afford.

Another factor which is related to cost is the useful life of such panels. For a panel to be commercially acceptable, it must be capable of providing a useful life which is sufficient to prevent unnecessary, repetitive replacement of the panels. However, the panels above mentioned are an assemblage of discrete components, many of which are formed of different materials, giving rise to the potential for the uneven expansion and contraction of these components as the temperature of their environment changes. Such uneven expansion and contraction could eventually result in the failure of such panels, impairing their useful life. This problem becomes even more acute when such panels are mounted in rigid window mounting frames which further restrict their expansion and contraction, or when such panels are used as roofing sections, to form a skylight.

Coupled to the above problems is that of initially installing, as well as repairing, such panels. A panel comprising a plurality of discrete components requires additional care in its installation, to assure proper alignment of the components, as well as to insure proper operation of the window. These problems are also present when a given panel requires replacement. Such additional problems result in increased costs in installing such a system, and in repairing that system, further reducing its commercial acceptability.

A last factor is that of esthetics. Ideally a window should be functional without detriment to its pleasing visual effect, an objective not easy to attain.

A commercially acceptable solar window panel which is capable of providing all four of the energy transmitting, energy reflecting, and heat insulative properties required for proper operation of the resulting passive solar energy system has not yet been produced.

SUMMARY OF THE INVENTION

This invention relates generally to the field of passive solar energy systems, and in particular, to a solar window panel which is commercially acceptable and which has light transmitting and light reflecting properties, and which has heat insulating properties, which vary in relation to the seasons of the year.

In accordance with the present invention, a window panel structure is provided which comprises at least an inner and an outer face, and a plurality of longitudinally extending ribs positioned therebetween, which structure is unitary in construction. This is accomplished preferably by forming the panel using the extrusion process, thereby eliminating the need for producing a panel from a plurality of discrete components.

The inner and outer faces of the panel, and the intermediately positioned ribs, are geometrically positioned and treated to permit passage of direct solar radiation at low solar altitudes, to prevent passage of direct solar radiation at high solar altitudes, and to provide insulating dead-air spaces to retard heat transfer through the panel. In this manner, all four of the characteristics which are required to produce a properly operating passive solar energy system are provided. Moreover, the unitary construction of the panels used to form such a system provides that system with the commercial acceptance that previous systems could not provide.

To provide the light transmitting and light reflecting properties above described, the faces and ribs of the panel are formed of two materials. One of these materials is essentially clear, enabling solar radiation to pass directly through the panel. The other material used is essentially opaque, preventing the direct passage of solar radiation through that panel. The opaque material is preferably white to avoid heating the ribs particularly in the summer. This is yet another distinction over active solar collector panels where the interior separations (which are dark) act as solar energy collectors, whereas here the ribs are light-reflecting, preferably as a diffuse light.

The white opaque portions, and the clear portions, meet along color interfaces which are continuous and struction, forming a unitary window panel. The absence of such physical discontinuities is enabled by producing the panels using the coextrusion process, which process involves the use of two extrudes, one provided with a clear thermoplastic material, and the other provided with a white thermoplastic material, and a single die. The color interfaces are thus formed simultaneously, and continuously, while maintaining their effectiveness.

The reduced costs afforded by producing a window panel in this manner, as well as the increased useful life and decreased maintenance costs afforded by such a panel construction, enables such solar window panels to be combined to form a commercially acceptable passive solar energy system useful in a wide variety of applications.

Accordingly, it is an object of the present invention to provide a solar window panel which is capable of being used to form a commercially acceptable passive solar energy system.

It is another object of the present invention to provide a commercially acceptable solar window panel which allows the passage of winter-month solar radiation and prevents the passage of summer-time solar radiation into a structure, and which insulates against conductive-convective-reradiative heat gains or heat losses from a building.

It is another object of the present invention to provide a commercially acceptable solar window panel which permits passage of direct solar radiation at low solar altitudes, prevents passage of direct solar radiation at high solar altitudes and provides insulating dead-air spaces to retard heat transfer through the panel.

It is another object of the present invention to provide a commercially acceptable solar window panel which is unitary in construction.

It is another object of the present invention to provide a commercially acceptable window panel which does not materially reduce the amount of sky light admitted into the structure provided with the panel.

It is another object of the present invention to provide a commercially acceptable window panel which has an adequate useful life and which is easily installed, repaired or replaced.

It is another object of the present invention to provide a commercially acceptable window panel having all of the foregoing advantages and which is also esthetically pleasing to a person viewing through the window panel.

These objects and others will become apparent to those skilled in the art from the following disclosure of the preferred embodiment of the invention taken in conjunction with the drawings provided in which like reference characters refer to similar parts throughout the several views provided, in which:

DESCRIPTION OF THE PREFERRED EMBODIMENTS OF THE INVENTION

Although specific terms are used in the following description for the sake of clarity, these terms are intended to refer only to the particular structure of the invention selected for illustration in the drawings, and are not intended to define or limit the scope of the invention.

Figure 1:
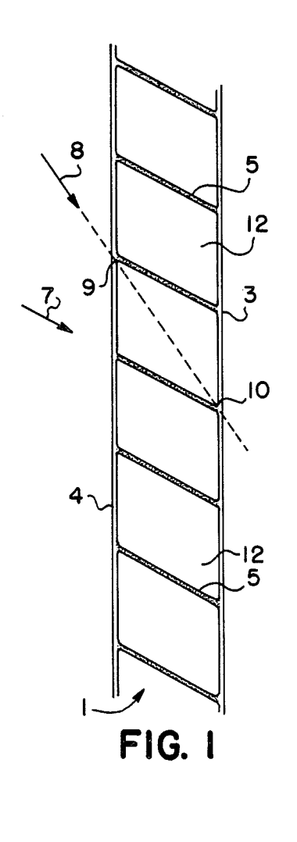
FIGS. 1 and 2 are partial cross sectional views showing two different embodiments of double glazed window panels in accordance with the present invention.
Figure 2:
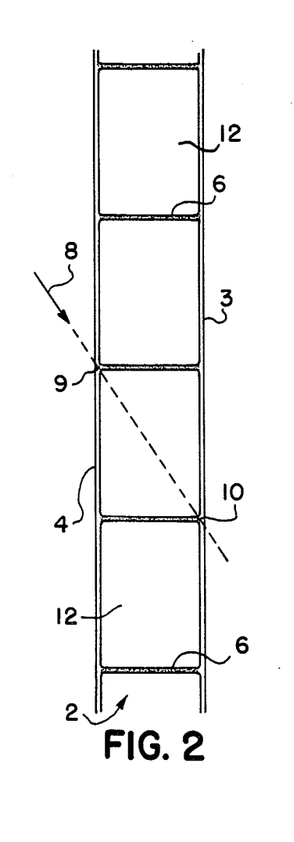

Referring now to the drawings, there is shown in FIGS. 1 and 2, two embodiments of window panels of the present invention, which panels are double glazed. Each window panel 1, 2 comprises a pair of faces 3,4; a first, inner face 3 being positioned toward the interior of the structure provided with the panel 1,2, and a second, outer face 4 being positioned toward the exterior of the structure provided with the panel 1,2; and a plurality of ribs 5,6 which are connected to, and extend between, the inner face 3 and outer face 4 of the panel 1,2.

Faces 3,4 are shown as being essentially planar in cross section. A smooth, planar surface is preferred since panels 1,2 are to take the place of the ordinary windows of a structure. Consequently, it is desirable to simulate this window-like structure when forming panels 1,2. However, other shapes could be utilized if desired; for example, arcuate shapes could be used to produce a bowed window panel 1,2. Panels 1,2 having other shapes could be produced in similar manner.

Ribs 5,6 are also shown as being essentially planar in cross section. Planar ribs 5,6 are preferred to uniformly reflect and diffuse the solar radiation impinging upon the surface of ribs 5,6. However, in some applications it may be desirable to use ribs 5,6 which are non-planar in shape; to disperse the solar radiation which impinges upon the ribs 5,6, rather than to uniformly reflect that solar radiation. Thus, ribs 5,6 could be arcuate in shape, or piecewise linear in shape, or other shapes could be used, depending upon the application involved.

The panel 1 of FIG. 1 has ribs 5 which are oblique to the inner face 3 and outer face 4. The angle at which ribs 5 are placed is preferrably varied with the solar altitude (represented by the arrow shown at 7 in FIG. 1) for a given area, typically varying in response to the latitude at which the panel 1 is to be used. Generally, a lower rib angle would be used at higher latitudes while a higher rib angle would be used at lower latitudes.

It is also possible, although less preferable, to have ribs which are positioned perpendicular to the faces 3,4. The ribs 6 shown in FIG. 2 are illustrative of such a panel. In such case, the angular positioning of the ribs 6 is not responsive to the solar altitude or the latitude at which the panel is to be used.

In either case, the distance between adjacent ribs 5,6 of panels 1,2 respectively is preferably determined in response to the solar altitude at and above which no directed solar radiation is to be transmitted through the panel (represented by the arrows shown at 8 in FIGS. 1 and 2). This is controlled by the positioning of the opposite ends of adjacent ribs 5,6, as shown at 9 and 10, respectively, in FIG. 1 and 2. For solar altitudes greater than those represented by the arrows 8, solar radiation is prevented from directly entering the structure. For solar altitudes less than those represented by the arrows 8, solar radiation is permitted to enter the structure.

Since the panels 1,2 are to be used as window structures, which window structures are to also serve as a passive solar energy system, faces 3,4 of panels 1,2 are preferably transparent to solar radiation. Although transparent faces 3,4 are preferred, it is also possible to produce faces 3,4 which are tinted to some extent. However, tinting faces 3,4 would reduce the amount of solar radiation which is capable of being transmitted through the panels 1,2 and into the structure. In certain applications, this reduction may be desirable.

Figure 9:
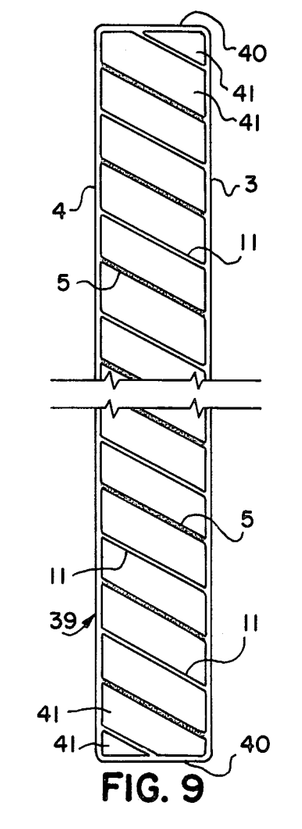
FIG. 9 is a partial cross sectional view of a window panel having squared ends.

At least some of the ribs 5,6 of panels 1,2 must be opaque to solar radiation. This is necessary to provide the desired light transmitting and light reflecting properties of the passive solar energy system. In the panels of FIG. 1 and FIG. 2 all of the ribs 5,6 are opaque to solar radiation. However, as illustrated in FIG. 9, not all the ribs 5,6 must be opaque. It is also possible to position additional ribs 11 between the opaque ribs 5, which additional ribs 11 are transparent to solar radiation. These additional ribs 11 provide a panel 39 which has essentially the same light transmitting and light reflecting properties of the panel 1 of FIG. 1. The additional ribs 11 positioned between its faces 3,4 provide convection inhibition and additional structural strength.

The panels 1,2, illustrated in cross section, are capable of being produced having a variety of lengths. Coextrusion is a continuous process, and consequently, panels 1,2 of any length desired may be produced. The width of the panel 1,2 as well as its shape, is determined by the width and shape of the coextrusion die. Although any width may be selected for production, a width of approximately four feet is of particular interest in the United States.

The coextrusion process is used to manufacture the panels 1,2 so that the transparent and opaque surfaces may be formed without requiring an assemblage of discrete components. The transparent and opaque surfaces are joined along color interfaces having no physical discontinuities, to produce a seamless, one-piece panel 1,2.

Two extruders are used to form the panels 1,2. One extruder forms the transparent portions of the panel. This is preferably a clear thermoplastic material. The other extruder would form the opaque portions of the panel. This is preferably a white thermoplastic material. The clear and white elements of the panel are thus formed simultaneously, and continuously as the panel is extruded.

Various materials can be used to form unitary window panels 1,2 in this way. Of particular interest are acrylic polymers principally poly(methyl methacrylate), in various standard and impact-resistant grades. Also of interest is polycarbonate, in ultra-violet-stabilized clear, and pigmented white, compositions. Another material of some interest is poly(vinyl chloride), optionally having a surface coating to reduce photo-oxidative degradation.

The panels 1,2 above described provide all the characteristics which are necessary for the proper operation of a passive solar energy system.

The ribs 5,6 are positioned so that during the winter months, when the solar altitude is at its lowest, solar radiation is largely permitted to directly enter the structure, to provide heat for that structure. During the summer months, when the solar altitude is at its highest, solar radiation is largely prevented from directly entering the structure, to reduce the unwanted heating of the structure during warm periods.

The channels 12 which are formed by the ribs 5,6 and faces 3,4 provide dead-air spaces which retard heat transfer through the panel 1,2, during both winter and summer periods.

Accordingly, a solar window panel is provided which has all of the previously mentioned desirable features, and which is unitary in construction, not having to be assembled from an assemblage of discrete components.

Figure 3:
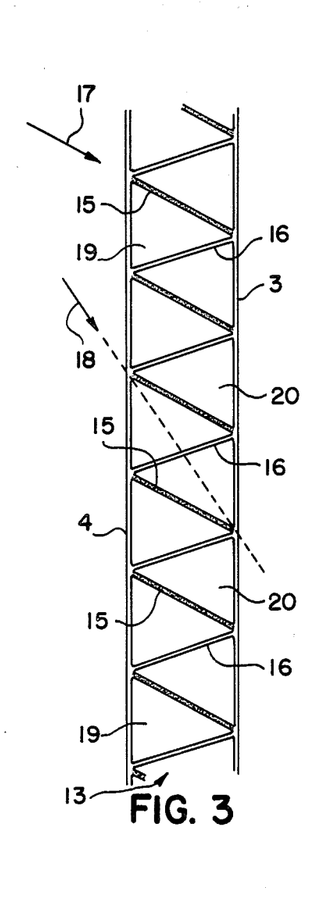
FIGS. 3, 4 and 5 are partial cross sectional views showing three different embodiments of triple glazed window panels.
Figure 4:
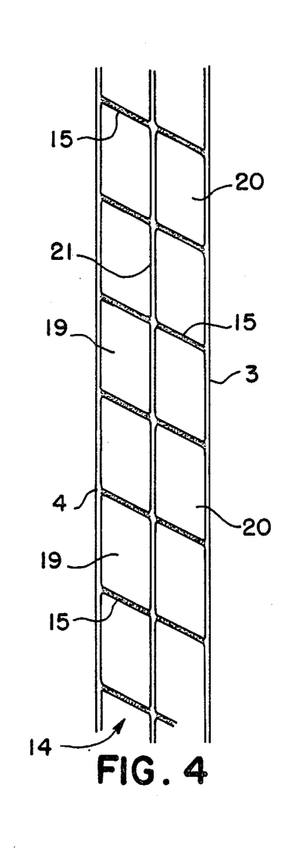

FIGS. 3 and 4 illustrate two, preferred embodiments of window panels of the present invention. The panels 13,14 illustrated are essentially triple glazed panels, which panels perform in a manner similar to that of panels 1,2.

The panel 13 illustrated in FIG. 3 comprises an inner face 3 and outer face 4 between which are connected a plurality of ribs 15,16, some of which ribs 15 are opaque to solar radiation, and some of which ribs 16 are transparent to solar radiation.

Opaque ribs 15 are again angularly positioned, and separated by a distance, responsive to the solar altitude, and consequently, the latitude at which the panel 13 is to be used, in the manner previously described.

For example, the opaque ribs 15 are angled at 28° in the panel 13 shown in FIG. 3. This would correspond to a maximum direct solar transmission at a solar altitude of 28°, which would occur at 40° north latitude at noon in mid-January and early December, and at 10 A.M. and 2 P.M. on 4 November and 8 February (represented by the arrow shown at 17 in FIG. 3). This rib angle would be typically varied with major differences in latitude; being increased at lower latitudes and decreased at higher latitudes. Moreover, a higher rib angle would be chosen if maximum noon direct solar transmission is desired for a date further removed from the winter solstice; for example a 35° rib angle would correspond with the maximum noon transmission on 4 November and 8 February.

The distance between ribs 15 at a given rib angle is determined by the solar altitude at and above which no direct radiation is to be transmitted through to the building. In FIG. 3 complete cutoff is to occur at 55° solar altitude (represented by the arrow shown at 18 in FIG. 3). Consequently, no direct transmission of solar radiation would occur between 10 A.M. and 2 P.M. between 11 May and 3 August, in the above example (at 40° north latitude).

As shown in FIG. 3, the channels defined by faces 3,4 and ribs 15 are additionally divided by ribs 16, which ribs 16 are transparent to solar radiation. In this manner two sets of channels 19,20 are formed, an outer group of channels 19, and an inner group of channels 20. This produces a panel 13 which is effectively triple glazed, providing improved insulating capabilities over that of a double glazed panel, without materially altering its light transmitting and light reflecting capabilities. Moreover, due to the small, convection inhibiting channels 19,20 produced, convection currents within the channels 19,20 are reduced even over simple, conventional triple glazed panels.

The panel 14 illustrated in FIG. 4 comprises an inner face 3 and outer face 4, a plurality of opaque ribs 15, and an additional face 21 positioned intermediate the inner and outer faces 3,4. Opaque ribs 15 are positioned, with respect to faces 3,4 and with respect to each other, in the same manner as were the ribs 15 of the panel 13 of FIG. 3, as described above. Consequently, the panel 14 has essentially the same operating characteristics as does the panel 13 of FIG. 3.

The same light transmitting and light reflecting capabilities are exhibited, as are the same heat insulating capabilities. This is due to the presence in panel 14 of the additional face 21 intermediate the faces 3,4, to thereby provide a triple glazed panel 14. Additional face 21 is preferably transparent to solar radiation. However, as with faces 3,4, face 21 could be tinted if desired, which would correspondingly modify the light transmitting and light reflecting capabilities of the panel 14. Additional face 21 is shown as being positioned midway between, and parallel to the faces 3,4. Other positions are possible if desired, however the position illustrated is preferred.

Accordingly, panels 13,14 each provide a triple glazed panel having the light transmitting and light reflecting capabilities, and the insulating capabilities, which are necessary to produce an effective passive solar energy system. Each serves well to provide this result, however, due to its triangular rib construction, the panel 13 of FIG. 3 will be a slightly more rigid panel then is the panel 14 of FIG. 4.

Figure 5:
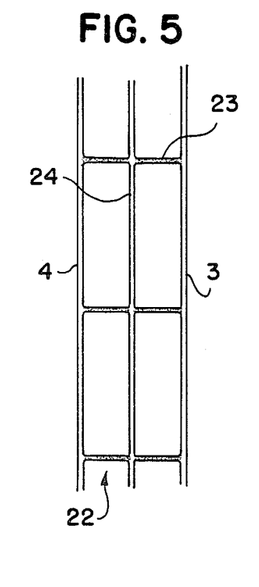
Figure 6:
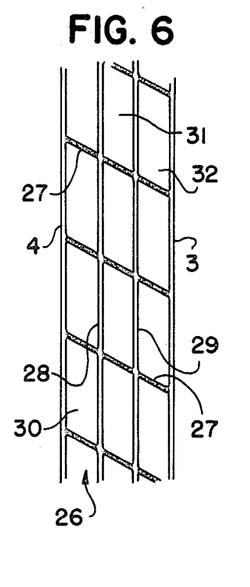
FIG. 6 is a partial cross sectional view showing a quadruple glazed window panel.
Figure 7:
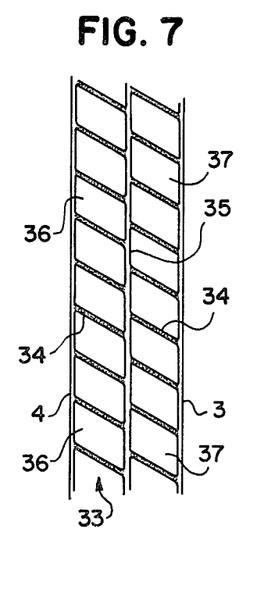
FIG. 7 is a partial cross sectional view showing a tirple glazed window panel having offset opaque ribs.

Many variations of the foregoing are possible, some examples of which are illustrated in FIGS. 5-7.

FIG. 5 illustrates a panel 22 which is double glazed. The panel 22 has ribs 23 which are perpendicular to the inner and outer faces 3,4, and has an additional face 24 which is parallel to and positioned between the inner face 3 and outer face 4. Ribs 23 are opaque, and additional face 24 is transparent. These components combine to form essentially rectangular channels 25 which provide insulation to the panel 22.

FIG. 6 illustrates a panel 26 which is quadruple glazed. The panel comprises an inner face 3 and an outer face 4, a plurality of opaque, oblique ribs 26, and a pair of additional faces 28,29, which additional faces are transparent to solar radiation. These components combine to form three groups of heat insulating channels 30,31,32, to provide improved heat insulative capabilities. Channels 30 face toward the exterior of the panel 26, channels 32 face toward the interior of the panel 26, and channels 31 are positioned between groups of channels 30,32.

FIG. 7 illustrates a panel 33 which is triple glazed. Panel 33 comprises an inner face 3 and an outer face 4, a plurality of opaque, oblique ribs 34, and an additional face 35 positioned parallel to, and between faces 3,4. These components combine to form two groups of channels 36,37; an outer group of channels 36, and an inner group of channels 37. Panel 33 has ribs 34 which are positioned so that those ends of the ribs 34 which are connected to either side of the additional face 35 are not juxtaposed with each other. Consequently, the channels 36,37 are also not juxtaposed along their entire length.

Each of the foregoing panels 22,26,33 have ribs which are positioned in accordance with the solar altitude, as described previously. Each of the panels 22,26,33 has the light transmitting and light reflecting capabilities, and the heat insulating capabilities, which were previously discussed. The relationship between these capabilities depends largely upon the glazing selected for use. For example, a double glazed panel will transmit more winter solar radiation than will a triple or quadruple glazed panel, however such a panel will also allow more heat transfer through the panel than would a triple or quadruple glazed panel. The converse is also true. The configuration selected therefore depends largely upon the application, as well as the location of the installation.

Figure 8:
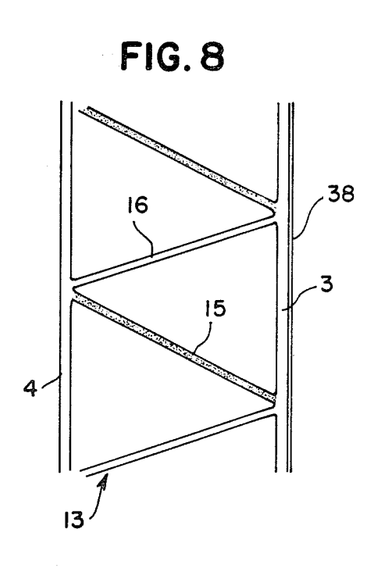
FIG. 8 is an enlarged partial cross sectional view of the window panel of FIG. 3 also showing the water-vapor barrier layer.

FIG. 8 shows an enlarged illustration of the panel 13 shown in FIG. 3. Similar reference numerals denote similar structure. Also illustrated is the use of a thin layer 38 of a polymer material which has a very low rate of water-vapor transmission, formed on the outer side of the inner face 3 of the panel 13. This would help prevent the condensation on the inner surface of a cold outer face 4 which can occur with multiple plastic glazings as water vapor is transported by diffusion across the glazing from the inside of the building. Water-vapor-barrier materials of interest include certain halocarbon polymers (e.g., ethylene-chlorotrifluoroethylene copolymer or fluorinated ethylene-propylene copolymer). This layer 38 could also be formed on the inner side of the inside wall 3 of the panel 13 if desired.

Figure 10:
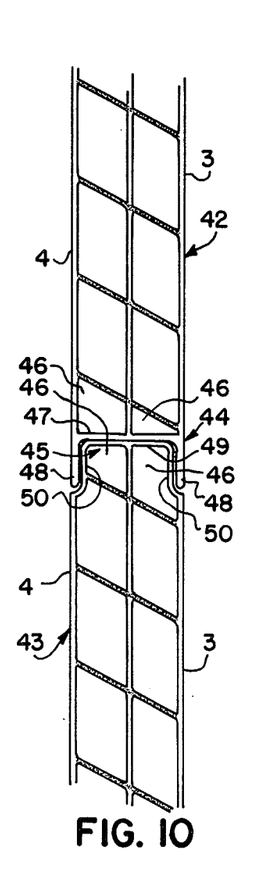
FIG. 10 is a partial cross sectional view of a window panel having interlocking ends.
Figure 11:
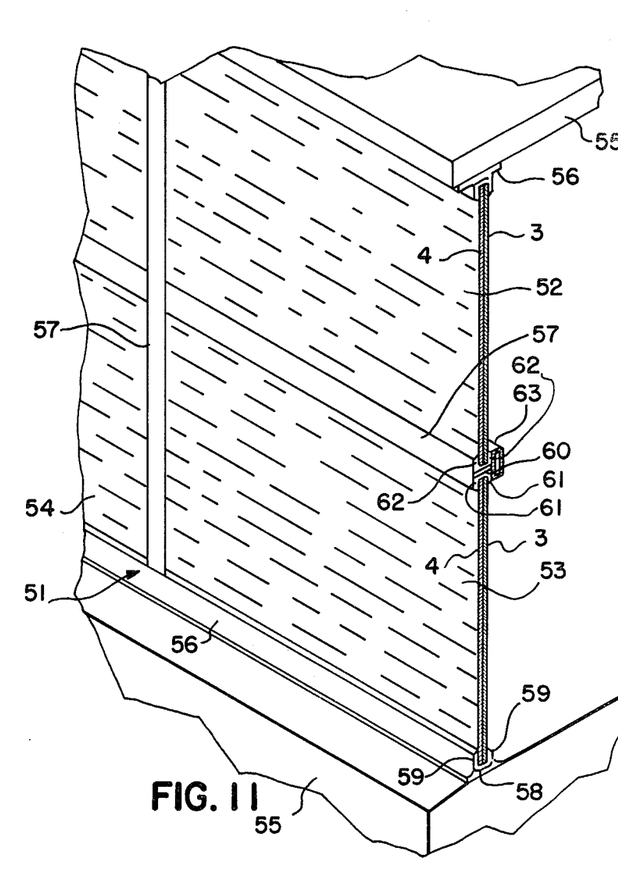
FIG. 11 is a partial isometric view of a group of window panels and means for mounting the group of window panels to a structure.

FIGS. 9-11 illustrate various means for mounting the window panels to a structure. The panel 39 shown in FIG. 9 is provided with squared ends 40 at its top and bottom. Squaring the ends 40 of the panel 39 fully encloses those channels 41 which extend to the end of the panel 39, to provide the proper insulating effect from those channels. Moreover, this provides a squared structure which is well suited to being fitted into an appropriate frame, for eventual attachment to a structure.

The panels 42,43 shown in FIG. 10 are provided with interlocking ends 44,45. In this manner, two panels 42,43 may be connected directly to each other, without requiring additional assembly components. Further, the interlocking ends 44, 45 serve to square off the panels 42,43, fully enclosing those channels 46 which extend to the end of the panels 42,43.

A first interlocking end 44 comprises a base portion 47 which is essentially perpendicular to the inner and outer faces 3,4 of the panel 42, and a pair of interlocking lips 48 which extend outward from the base portion 47 and the inner and outer faces 3,4 of the panel 42, and which are essentially parallel with the inner and outer faces 3,4 of the panel 42.

A second interlocking end 45 comprises a base portion 49 which is essentially perpendicular to the inner and outer faces 3,4 of the panel 43, and a pair of detents 50 which extend inward from the base portion 49 and the inner and outer faces 3,4 of the panel 43, and which are essentially parallel with the inner and outer faces 3,4 of the panel 43.

The base portions 47,49 are provided to enclose those channels 46 which are located at the ends of the panels 42,43 respectively.

The lips 48 of the panel 42 are adapted to engage the detents 50 of the panel 43, to thereby connect the respective ends of the panels 42,43 to each other.

The remaining ends of the panels 42,43 may be provided with additional lips 48 or detents 50, to be used to engage additional, adjacent panels, or, may be provided with squared ends, of the type shown in FIG. 9, which are capable of being fitted into a frame for suitable attachment to a structure.

FIG. 11 illustrates a framing system 51 which is suitable for attaching a panel or group of panels 52,53,54 to a structure. The panels are illustrated as being attached to the wall 55 of a building. However, it is similarly possible to mount a panel, or group of panels to the roof of a building, as well as to various other types of structures. For example, such panels may be used for homes, warehouses, manufacturing buildings, barns or livestock buildings, schools, swimming pool enclosures, transportation passenger shelters, enclosed pedestrian bridges, exhibition halls, mobile homes, vans, garages, green houses, or any other structure having windowed areas.

The framing system 51 illustrated uses two types of frame members 56,57.

A first type of frame member 56 is used to attach a panel to a structure, and comprises a base portion 58 and a pair of legs 59 which are connected to the base portion 58. The base portion 58 is preferably squared and perpendicular to the faces 3,4 of the panel 53, in order to uniformly engage the squared end of panel 53. The legs 59 extend outward from the base portion 58, and are preferably positioned so that they are essentially parallel to the faces 3,4 of the panel 53, and so that they are separated by a distance substantially equal to the thickness of the panel 53. In this manner, the base portion 58 may be connected to the wall 55 of the structure, and the panel 53 may then be positioned over the base portion 58 and between the legs 59, thereby being engaged by the frame member 56.

A second type of frame member 57 is used to attach a first panel 53 to a second panel 52,54 which is adjacent to that first panel 53. This frame member 57 is therefore used as an alternative to the interlocking ends 44,45 illustrated in FIG. 10. Either the frame member 57 or the interlocking ends 44,45 may be used in combination with the frame member 56 to attach a plurality of panels to a structure.

Frame member 57 comprises a base portion 60 and pairs of legs 61,62 which are connected to the base portion 60. Again, the base portion is preferably squared and perpendicular to the faces 3,4 of the panels 52,53,54, to uniformly engage the squared ends of a panel to be engaged by the frame member 57. Each pair of legs 61,62 extend outward from the base portion 60, and are preferably positioned so that they are essentially parallel to the faces 3,4 of the panels, and so that they are separated by a distance substantially equal to the thickness of the panel to be engaged. In this manner the end of a panel 52,53,54 to be engaged by the frame member 57 is retained between the base portion 60, and one of the pairs of legs 61,62, retaining the panels 52,53,54 to each other.

Both the frame members 56,57 may extend either horizontally or vertically to retain a plurality of panels to a structure. If desired, additional support members 63 may be used to provide further rigidity to the framing system 51.

Figures 12, 13, 14:
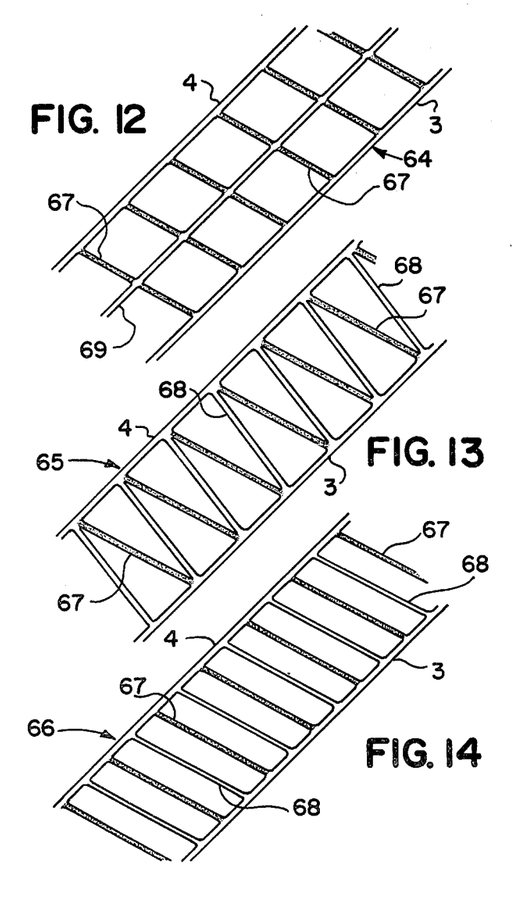
FIGS. 12, 13 and 14 are partial cross sectional views of window panels having ribs configured for placement of the window panel on the roof of a structure.

The above discussion relates principally to the placement of window panels along the walls of a structure. It is equally possible to place such panels on the roof of a structure, to form a skylight for example. FIGS. 12-14 illustrate several examples of panels 64,65,66 which are adapted for placement on the roof of a structure.

FIGS. 12 and 13 illustrate roof panels 64,65 which are triple glazed. FIG. 14 illustrates a roof panel 66 which is double glazed. The panels 64,65,66 illustrated are essentially equivalent in structure and operation to the panel 14 illustrated in FIG. 4, the panel 13 illustrated in FIG. 3, and the panel 39 illustrated in FIG. 9, respectively.

In order to produce panels 64,65,66 which are capable of placement on the roof of a structure, the orientation of the ribs 67,68 must account for the angular inclination of the roof to which it is attached, as well as the solar altitude. Consequently, the rib angle will increase, and the distance between adjacent ribs will decrease, as the angular inclination of the roof increases.

In FIGS. 12-14, the ribs 67 are opaque to solar radiation, preferably being white, and the ribs 68 are transparent to solar radiation, preferably being clear. The additional face 69 is preferably transparent to solar radiation, being positioned between inner and outer faces 3,4.

Figure 15:
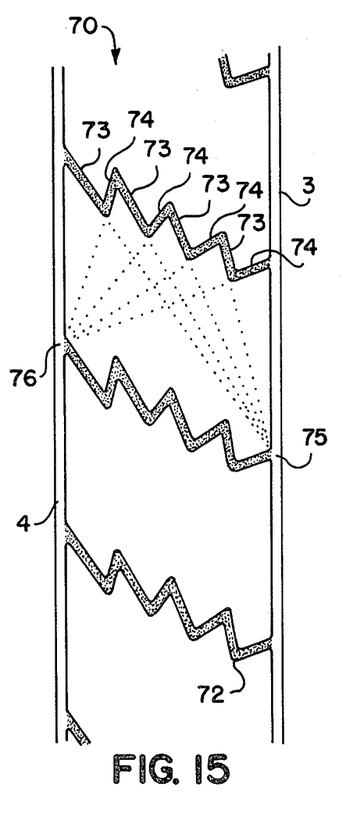
FIGS. 15 and 16 are partial cross sectional views of window panels having ribs which have a zig-zag configuration.
Figure 16:
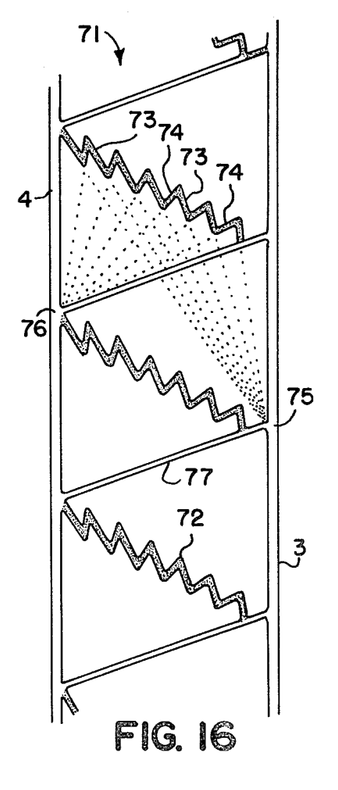

FIGS. 15 and 16 illustrate still another embodiment of the solar window panel of the present invention. The panels 70,71 illustrated comprises an inner face 3 and outer face 4, and a plurality of ribs 72 which are configured to prevent any of the sunlight incident on the ribs 72 from being directly reflected, either specularly or diffusely, into the structure. Such a rib configuration is particularly of interest when the prevention of summertime overheating is very important, however such a configuration will also result in a slight reduction of winter-time solar heating as well.

The ribs 72 illustrated are formed in a zig-zag pattern, and are opaque to solar radiation. As a result, the amount of solar radiation which is permitted to pass directly through to the structure is reduced, due to the added thickness of the opaque ribs 72 of the panel 70,71. The amount of solar radiation which is transmitted through the panels 70,71 decreases as this thickness increases.

To prevent the direct reflection of sunlight into the structure, the linear portions 73,74 of the ribs 72 are oriented so that they angularly converge upon the points where the next lower rib 72 is connected to the inner and outer face 3,4 of the panel 70,71. As illustrated in FIGS. 15 and 16, linear portions 73 are angularly oriented to converge upon the point at 75, and linear portions 74 are angularly oriented to converge upon the point at 76.

The number of linear portions 73,74 which comprise each of the ribs 72 may be varied; the ribs 72 of the panel 70 illustrated in FIG. 15 having fewer linear portions 73,74 than the ribs 72 of the panel 71 illustrated in FIG. 16. As the number of linear portions 73,74 which comprise the ribs 72 is increased, the thickness of those ribs 72 decreases. Consequently, as the number of linear portions 73,74 increases, so does the amount of solar radiation directly transmitted through to the structure.

As illustrated in FIG. 16, the panels 70,71 may also comprise transparent ribs 77 if desired, to increase their rigidity.

It may therefore be seen that the above disclosed invention serves well to accomplish the objects previously stated. The solar panels produced are unitary which increases their strength and reliability in operation, and which decreases their cost of production. Moreover, such panels are light in weight, and are capable of being installed or replaced quickly and easily, providing a commercially acceptably passive solar energy system.

It may also be seen that the above described invention may be embodied in other specific forms in addition to those above disclosed and therefore the disclosure made should be interpreted in an illustrative and not a limiting sense.

I claim:

1. A solar panel adapted for use as a window for a structure located at a particular latitude of the earth, which panel combines light transmitting and light reflecting members to permit passage of direct solar radiation at a low solar altitude and to prevent passage of direct solar radiation at a high solar altitude, and which panel provides insulating dead air spaces to retard heat transfer through the panel structure, which panel comprises an inner face and an outer face spaced therefrom, each face being essentially planar and being adapted to be positioned along the inner and outer portions of the structure to which it is connected, respectively and a plurality of fixed integral rib members connected to and extending between the inner face and the outer face, at least some of which are essentially opaque to solar radiation, those ribs which are not essentially opaque to solar radiation being essentially transparent, said inner face, outer face and ribs being integrally formed of fixed, rigid unitary construction, said rib member having a slope in the range from horizontal to upwardly inclined from the inner face toward the outer face of the panel, the fixed angle of inclination, the width of the rib members and the relative spacing of the opaque rib member being selected for the particular latitude of the building to determine a cut-off angle for solar radiation at that latitude, so that when the sun is below a particular altitude, there is direct transmission of light and energy into the structure, but when the sun is above the particular altitude the panel will absorb or reflect substantially all solar radiation impinging upon the panel.

2. The panel of claim 1 which further comprises at least one additional face, positioned between the inner and outer faces, which additional face is also capable of having connected thereto at least some of the rib members.

3. The panel of claim 2 wherein the additional face is essentially transparent to solar radiation.

4. The panel of claim 1 or 2 wherein the faces and rib members extend longitudinally to combine to form a plurality of heat insulating channels.

5. The panel of claim 4 wherein the rib members are perpendicular to the faces.

6. The panel of claim 2 which has a first set of rib members connected to and extending between the outer face and the additional face, and which has a second set of rib members connected to and extending between the additional face and the inner face, wherein those ends of the rib members of the first set and those ends of the rib members of the second set which are connected to the additional face are not juxtaposed to each other.

7. The panel of claim 1 wherein the rib members are positioned in a geometrical relationship which substantially prevents any solar radiation incident on the rib members from being directly reflected into the building.

8. The panel of claim 7 wherein at least some of the rib members have a zig-zag configuration.

9. The panel of claim 8 wherein the linear portions of those ribs members which have a zig-zag configuration are angularly positioned so that they converge upon the points where the next lower rib member is connected to the inner and the outer face of the panel, respectively.

10. The panel of claim 9 wherein those rib members which have a zig-zag configuration are opaque to solar radiation.

11. The panel of claim 10 wherein those rib members which have a zig-zag configuration are formed of an essentially white thermoplastic material.

12. The panel of claim 11 wherein all of the rib members have a zig-zag configuration.

13. The panel of claim 1 which further comprises a water-vapor barrier layer positioned along the inner face of the panel.

14. The panel of claim 13 wherein the water-vapor barrier layer is positioned along the outside of the inner face of the panel.

15. The panel of claim 13 wherein the water-vapor barrier layer is positioned along the inside of the inner face of the panel.

16. The panel of claim 13 wherein the water-vapor barrier layer is a halocarbon polymer.

17. The panel of claim 1 which further comprises means for interlocking the first panel with a second, juxtaposed panel, end to end.

18. The panel of claim 17 wherein the panel interlocking means comprises
- a pair of members, located at a selected end of the first panel, which extend outward from, and which are substantially parallel with, the inner and outer faces of the first panel, and
- a pair of detents, located at a selected end of the second panel, which extend inward from, and which are substantially parallel with, the inner and outer faces of the second panel,
- wherein the members of the first panel are adapted to engage the detents of the second panel, the selected end of the second panel thereby being engaged by the selected end of the first panel and the pair of members attached to that first panel.

19. The panel of claim 1 wherein the panel is double glazed.

20. The panel of claim 1 wherein the panel is triple glazed.

21. The panel of claim 1 wherein the panel is coextruded.

22. The panel of claim 1 wherein the inner and outer faces, and those rib members which are essentially transparent to solar radiation are formed of an essentially clear thermoplastic material.

23. The panel of claim 22 wherein the rib members which are opaque to solar radiation are formed of an essentially white thermoplastic material, and wherein the said opaque rib members are uncoated.

24. The panel of claim 23 wherein color interfaces comprising the clear portions of the panel and the whitened portions of the panel are formed simultaneously with the panel.

25. The panel of claim 1 wherein the angle formed between the plurality of ribs and the inner and outer faces is varied with the latitude at which the panel is to be used.

26. The panel of claim 1 and means for attaching the panel to an adjacent panel or to the structure.

27. The panel of claim 26 wherein the attaching means comprises a base portion, positioned essentially perpendicular to the inner and outer faces of the panel, and at least one pair of legs, connected to the base portion and extending outward from the base portion which legs are adapted to engage an end of the panel therebetween.

28. The panel of claim 27 wherein the attaching means is extruded.

29. The panel of claim 27 wherein the attaching means has a single pair of legs, and wherein the base portion is connected to the structure.

30. The panel of claim 27 wherein the attaching means has two pairs of legs, each pair of legs being adapted to engage a panel.

31. The panel of claim 23, wherein the said opaque rib members are fixed in their chosen position and wherein the said opaque rib members are uniformly white throughout their length.

32. The panel of claim 1 wherein said opaque rib members are inclined upwardly toward the outside at a preselected angle.

33. The panel of claim 1 wherein said opaque rib members are non-planar in shape whereby solar radiation which impinges upon said ribs are dispersed.

* * * * *